UNITED STATES PATENT OFFICE.

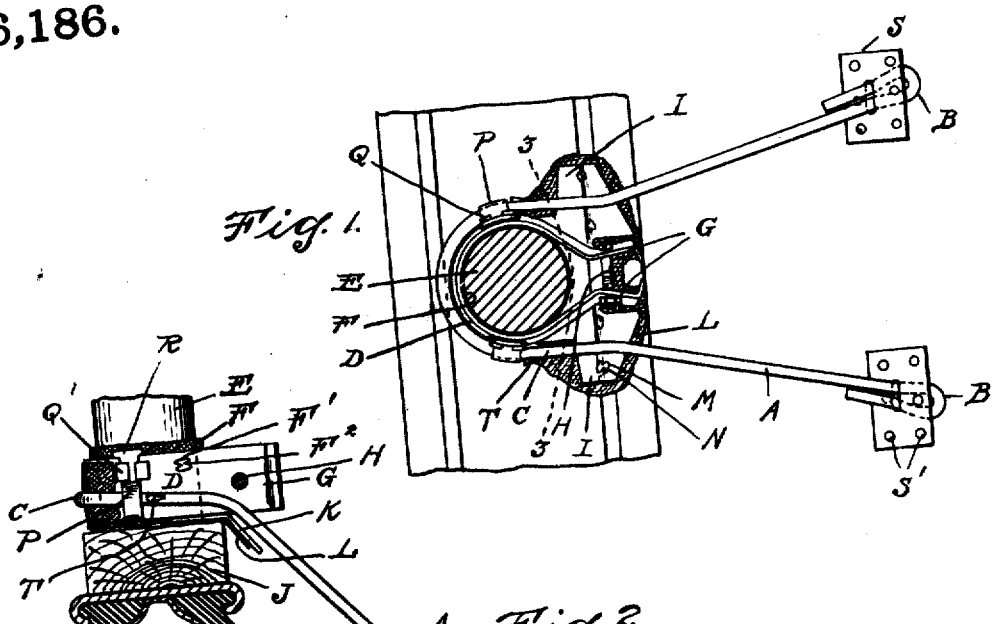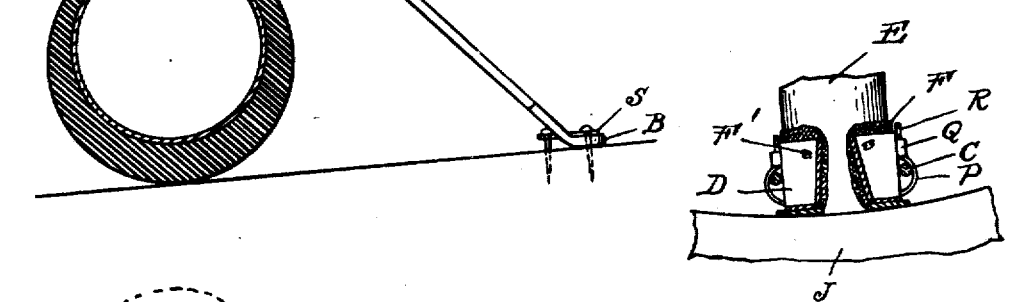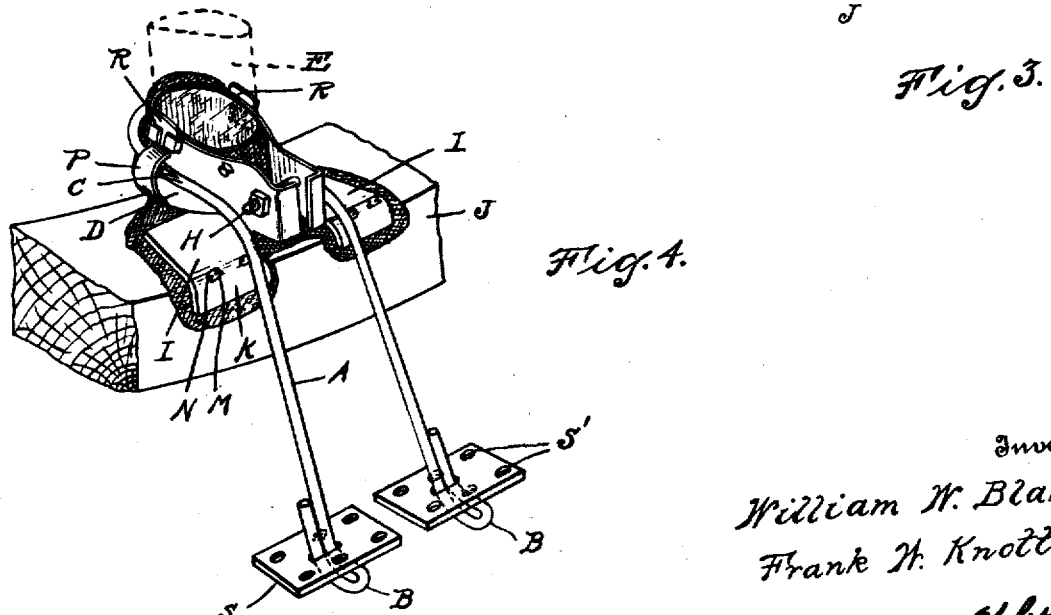

WILLIAM W. BLAKELY AND FRANK W. KNOTT, OF DETROIT, MICHIGAN; SAID KNOTT ASSIGNOR TO SAID BLAKELY.

WHEEL-ANCHORING DEVICE.

1,376,186.  Specification of Letters Patent.  Patented Apr. 26, 1921.

Application filed November 24, 1919. Serial No. 340,327.

*To all whom it may concern:*

Be it known that we, WILLIAM W. BLAKELY and FRANK W. KNOTT, citizens of the United States of America, residing at Detroit, in the county of Wayne and State of Michigan, have invented certain new and useful Improvements in Wheel-Anchoring Devices, of which the following is a specification, reference being had therein to the accompanying drawings.

This invention relates to wheel anchoring devices, such as are employed for fastening the wheels of a vehicle to a floor or other suitable surface during shipment of the vehicle.

The invention consists in the structural features and arrangements of parts hereinafter fully described.

In the drawings:

Figure 1 is a plan view of the device in use, a portion of the engaged vehicle wheel being shown in section;

Fig. 2 is a side elevation of the same;

Fig. 3 is a vertical sectional view taken upon the line 3—3 of Fig. 1;

Fig. 4 is a perspective view of the invention in use.

In these views the reference character A designates a tie member, formed by an arched rod or heavy wire, the legs of the arch being divergent and looped at their free ends and bent to form securing feet B. The upper end portion of the tie member A is bent at an obtuse angle to the body of said member, preferably in parallelism to said feet, as is indicated at C, said bent upper portion embracing the sheet metal clamping collar D, engaging a spoke E of a vehicle wheel. To prevent the finish of the spoke being injured by application of the collar thereto, the inner surface of the collar D is padded, as indicated at F, the pad being preferably formed by one or more layers of canvas, portions of which are deflected through orifices F' in the collar D and engaged within said orifices by prongs F² integral with the clamping collar. The collar D has substantially parallel end portions G with which the clamping bolt H is engaged for varying the diameter of the collar.

At its lower edge the collar D is integrally formed with oppositely projecting wings I for engaging the felly J of a vehicle wheel, said wings being similarly bent, as indicated at K, so as to have a bearing both upon an interior and a lateral surface of the felly. Preferably, integral portions L of the canvas pad F are engaged beneath the wings I to prevent damage to the finish of the felly by said wings, the desired relation of the pads L to the wings being maintained by deflecting portions of said pads into orifices M in the wings, within which orifices said portions are engaged by prongs N.

A loose mounting of the clamping collar D upon the arched member A is established by forming vertically elongated keepers P in suitable positions upon the collar, through which keepers the portion C of the member A is passed. The keepers P consist preferably of metal strips integrally engaged with the collar D at the lower edge thereof, said strips being bent upwardly in spaced relation to the collar and bent against the collar at their upper ends, said ends being engaged beneath pairs of tongues Q and retained in such engagement by heads R formed terminally on said strips.

Metallic securing plates S are mounted loosely upon the respective legs of the arch member A, said plates being formed with suitably located nail holes S'.

It is an important feature of the described anchoring device that it permits the vehicle to which it is applied to undergo a slight vertical movement responsive to vibrations and jolting of the freight car or other container in which the vehicle is being shipped, this feature residing in the loose mounting of the clamping collar D upon the tie member A, whereby the collar and the spoke which it embraces are allowed to rise and fall to a slight extent independently of said tie member. The provision upon the wings I of portions adapted to bear laterally upon the felly J is a further desirable feature of the invention, since the felly is thus caused to take considerable strain which might otherwise be imposed upon the spokes embraced by the clamping collar. It is to be understood that in applying the invention to a vehicle wheel, the clamping bolt H is temporarily removed and the end portions G of the collar D are sprung apart sufficiently to pass at opposite sides of a spoke.

What we claim as our invention is:

1. A wheel anchoring device comprising a clamping collar proportioned to engage a spoke of a vehicle wheel, means for adjusting said collar, and a tie member loosely carrying said clamping collar at one end and provided at the other with securing means.

2. A wheel anchoring device comprising an arched tie member, securing means carried by the feet of said tie member, a clamping collar loosely mounted upon and embraced by the closed end portion of said tie member proportioned to engage the spoke of a vehicle wheel, and means for adjusting said clamping collar.

3. A wheel anchoring device comprising an arched tie member, a clamping collar embraced by the closed end portion of said tie member proportioned to engage a spoke of a vehicle wheel, and a pair of keepers at opposite sides of said clamping collar loosely receiving the embraced portion of the arch member and respectively comprising strips integral with the clamping collar at the lower portion thereof bent upwardly in spaced relation to the collar and fixedly engaged with the collar at the upper ends.

4. A wheel anchoring device comprising a tie member engageable at its upper end with a vehicle wheel, and having an open loop at its lower end bent to form a securing foot and a nailing plate loosely engaging the foot portion of said tie member.

5. A wheel anchoring device comprising a tie member engageable at its upper end with a vehicle wheel, and bent at its lower end to form a foot and a nailing plate loosely retained upon said tie member by said foot.

6. An anchoring device comprising a slotted securing plate and a tie member provided at its lower end with a return-bent portion adapted to engage the slotted portion in said securing plate.

7. An anchoring device comprising a slotted securing plate and a tie member provided at its lower end with a looped return bend, said return-bent portion engaging the slotted portion in said securing plate to form a retainer therefor.

8. An anchoring device comprising a slotted securing plate and a tie member provided with a looped return bend for engaging the slotted portion of said plate to retain the same, said plate having an aperture therein adapted to aline with the loop in said return bend to receive a common securing means.

9. An anchoring device comprising an apertured securing plate, a tie member having a return bent portion engaging the apertured portion of the plate and arranged to prevent disengagement from the plate.

In testimony whereof we affix our signatures.

WM. W. BLAKELY.
FRANK W. KNOTT.